US011435883B2

United States Patent
Yang et al.

(10) Patent No.: US 11,435,883 B2
(45) Date of Patent: Sep. 6, 2022

(54) ELECTRONIC DEVICE, AND METHOD FOR CONTROLLING ELECTRONIC DEVICE

(71) Applicant: Samsung Electronics Co., Ltd., Suwon-si (KR)

(72) Inventors: Hejung Yang, Suwon-si (KR); Jisang Yu, Suwon-si (KR); Sangwon Lee, Suwon-si (KR); Indong Lee, Suwon-si (KR); Haengsun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/734,064

(22) PCT Filed: Jul. 10, 2019

(86) PCT No.: PCT/KR2019/008512
§ 371 (c)(1),
(2) Date: Dec. 1, 2020

(87) PCT Pub. No.: WO2020/013615
PCT Pub. Date: Jan. 16, 2020

(65) Prior Publication Data
US 2021/0223943 A1   Jul. 22, 2021

(30) Foreign Application Priority Data

Jul. 10, 2018 (KR) .................. 10-2018-0080234
Nov. 9, 2018 (KR) .................. 10-2018-0137605

(51) Int. Cl.
*G06F 3/04842* (2022.01)
*G06F 40/253* (2020.01)
*G06F 40/289* (2020.01)

(52) U.S. Cl.
CPC ........ *G06F 3/04842* (2013.01); *G06F 40/253* (2020.01); *G06F 40/289* (2020.01)

(58) Field of Classification Search
CPC .................................................. G06F 3/04842
See application file for complete search history.

(56) References Cited

U.S. PATENT DOCUMENTS 5,950,187 A * 10/1999 Tsuda ...................... G06F 17/30
9,245,254 B2    1/2016 Lord et al.
(Continued)

FOREIGN PATENT DOCUMENTS

| JP | 2005-018169 A | 1/2005 |
| JP | 2011-103027 A | 5/2011 |
| KR | 10-1228865 B1 | 2/2013 |

OTHER PUBLICATIONS

International Search Report dated Oct. 16, 2019, issued in International Patent Application No. PCT/KR2019/008512.
(Continued)

*Primary Examiner* — James J Debrow
(74) *Attorney, Agent, or Firm* — Jefferson IP Law, LLP

(57) ABSTRACT

Provided is an electronic apparatus. A method of controlling the electronic apparatus includes displaying at least one sentence, when receiving a user input regarding at least one character of the at least one sentence that is displayed, analyzing the at least one sentence by using the at least one sentence including at least one character and the at least one character, selecting a character set included in the at least one sentence according to an analysis result, and displaying a selected character set to be distinguished from other characters included in the at least one sentence.

13 Claims, 11 Drawing Sheets

(56) References Cited

U.S. PATENT DOCUMENTS

| | | |
|---|---|---|
| 2002/0040866 A1 | 4/2002 | Tuneld et al. |
| 2007/0118357 A1* | 5/2007 | Kasravi et al. ......... G06F 17/21 |
| 2007/0213974 A1* | 9/2007 | Xu ......................... G06F 17/27 |
| 2007/0281286 A1 | 12/2007 | Palacios Orueta |
| 2012/0329013 A1 | 12/2012 | Chibos |
| 2015/0347398 A1* | 12/2015 | Nozue ..................... G06F 17/28 |
| 2017/0308591 A1* | 10/2017 | Mohsin et al. ......... G06F 17/30 |

OTHER PUBLICATIONS

Extended European Search Report dated Apr. 30, 2021, issued in European Patent Application No. 19834454.1-1216.

* cited by examiner

| CHARACTER SET | ... | ¹스마일 | ²마스크 | ³증후군 | ... | ⁴스마일 마스크 증후군 | ... |
|---|---|---|---|---|---|---|---|
| GENERALITY SCORE | ... | 0.73456 | 0.52679 | 0.41181 | ... | 0.01220 | ... |

| SEARCHED CHARACTER SET | SEARCH TIME | SEARCH RESULT |
|---|---|---|
| 우울증 | 2018-04-11-13:34 | ... 우울증(憂鬱症, 영어: depression)은 감정을 조절하는 뇌의 기능에 변화가 생겨 '부정적인 감정'이 나타나는 병이며 전 세계 1억 명 이상이 앓고 있는 질환이다 ... |
| 번아웃 증후군 | 2018-04-11-11:27 | ... 번아웃 증후군은 미국의 정신분석학자 H. 프뤼덴버그가 자신이 치료하던 환자에게서 처음 발견하였습니다 ... |
| ⋮ | ⋮ | ⋮ |

FIG. 7

| No. | SENTENCE | SEARCH CATEGORY |
|---|---|---|
| 1 | 조앤롤링은 영국 사람으로, 해리포터를 창작한 유명한 작가로서... | BOOK/NOVEL |
| 2 | 유니버셜 스튜디오에 있는 해리포터는 가장 인기 있는 놀이... | RIDE |
| 3 | 해리포터를 연기한 다니엘 래드클리프는 최근에... | MOVIE |

ELECTRONIC DEVICE, AND METHOD FOR CONTROLLING ELECTRONIC DEVICE

TECHNICAL FIELD

The present disclosure relates to a method of selecting a content displayed on a display of an electronic apparatus including the display.

BACKGROUND ART

Recently, electronic apparatuses may provide various contents through a display. For example, an electronic apparatus may display on a display an image, a video, or text. An electronic apparatus may support an operation of searching for additional information corresponding to a user input to select a content displayed on a display.

For example, an electronic apparatus may enlarge an image or provide photography information in response to a user input to select the image. Also, an electronic apparatus may provide the meaning of text or related information in response to a user input to select the text.

DESCRIPTION OF EMBODIMENTS

Technical Problem

When a user selects some of characters displayed on a display in order to search for the meaning of the characters or related information, the user may experience inconvenience in accurately adjusting the start and end points of the characters to be searched for.

Thus, various embodiments of the present disclosure are provided to easily show a range of characters when a user selects the characters.

BRIEF DESCRIPTION OF DRAWINGS

FIG. 6 illustrates a state in which a search history is used to identify one of a plurality of character sets on an electronic apparatus according to an embodiment.

FIG. 7 illustrates a state in which an electronic apparatus selects a search category considering the content of a sentence.

BEST MODE

Figure 1A:
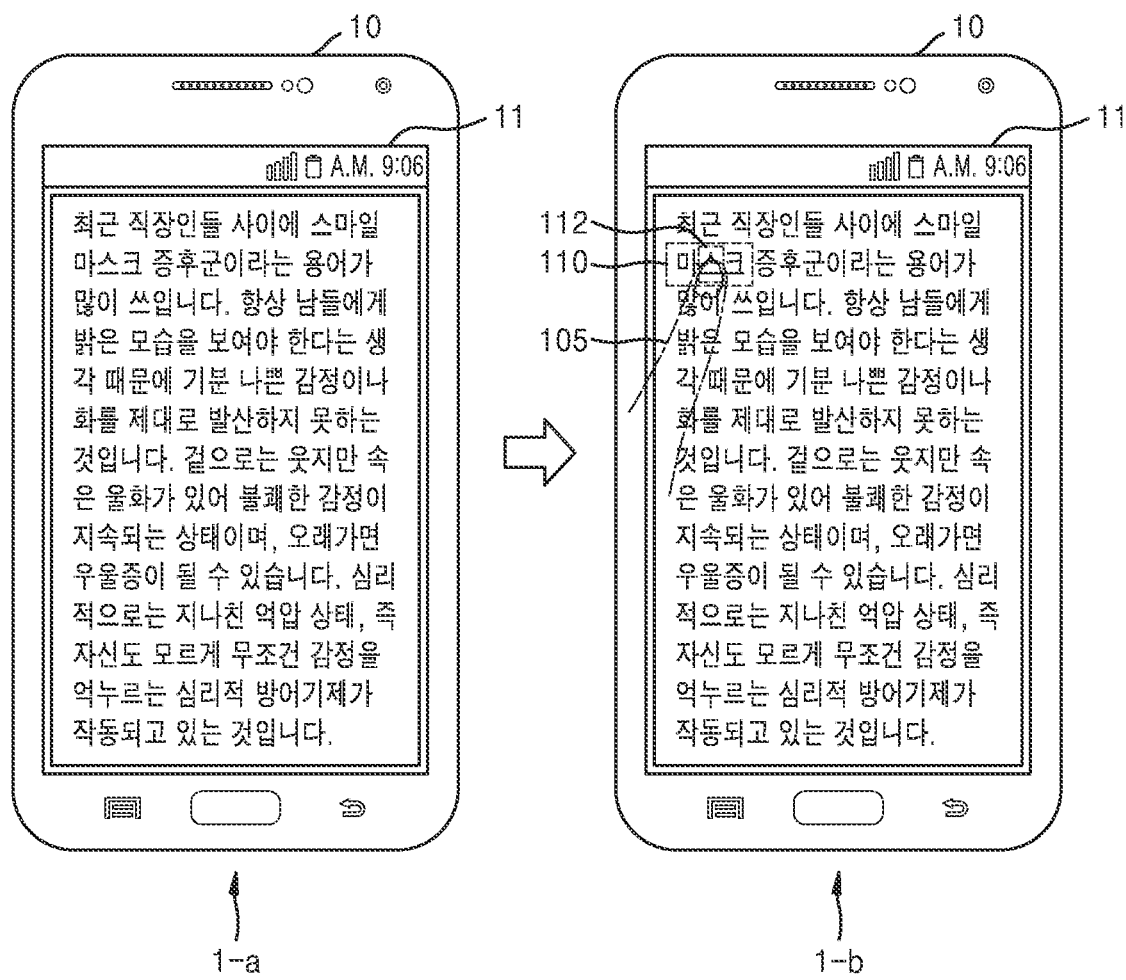
FIGS. 1A and 1B illustrate a state in which a plurality of characters are identified and displayed according to a user's selection on an electronic apparatus according to an embodiment.

According to one aspect of the disclosure, an electronic apparatus includes a display, a processor, and a memory, wherein the memory stores instructions to enable the processor to control the display to display at least one sentence received in response to a user input regarding at least one character of the at least one sentence that is displayed, analyze, in response to the user input, the at least one sentence by using the at least one sentence including the at least one character and the at least one character, select a character set included in the at least one sentence according to an analysis result, and display a selected character set to be distinguished from other characters included in the at least one sentence.

In an embodiment, the character set may include at least one character corresponding to the user input.

In an embodiment, the character set may include a plurality of characters.

In an embodiment, the character set may include a plurality of characters located adjacent to each other.

In an embodiment, the instructions may enable the processor to identify a search category based on a content of other character sets included in the at least one sentence when a search is performed by using an identified character set.

In an embodiment, the instructions may enable the processor to obtain a plurality of character set candidates, each character set candidate including a character selected corresponding to the user input and at least one neighboring characters, obtain a plurality of candidate sentences respectively corresponding to the plurality of character set candidates, and analyze the plurality of candidate sentences that are obtained, select one candidate sentence, and select a character set corresponding to a selected one candidate sentence.

In an embodiment, the instructions may enable the processor to analyze the at least one sentence on the basis of, when the plurality of character set candidates are substituted by other character sets, a connectivity score is obtained according to a correlation between substituted character set and other characters or other words included in the plurality of candidate sentences.

In an embodiment, the instructions may enable the processor to analyze the at least one sentence on the basis of obtaining the generality score according to frequency of use and importance of a character or a word included in each of the plurality of character set candidates.

In an embodiment, the instructions may enable the processor to analyze the at least one sentence according to classification of sentence constituent elements of the at least one sentence including the at least one character selected corresponding to the user input, in terms of grammatical characteristics of the sentence constituent elements.

In an embodiment, the instructions may enable the processor to use a search history previously stored in the memory when analyzing the at least one sentence.

In an embodiment, the electronic apparatus may further include a communication module, wherein the instructions enable the processor to control the communication module to transmit to a server the at least one sentence including the at least one character and the at least one character, and receive a result of selecting, by the server, a character set included in the at least one sentence by analyzing the at least one sentence by using the at least one sentence including the at least one character and the at least one character.

According to another aspect of the disclosure, a server includes a communication module, a processor, and a memory, wherein the memory stores instructions that enable the processor to control the communication module to receive, from an external device, a sentence including at least one character and the at least one character, wherein the processor analyzes, corresponding to the receiving, the sentence by using the sentence including the at least one character and the at least one character, select a character set included in the sentence according to an analysis result, and control the communication module to transmit a selected character set to the external device.

According to another aspect of the disclosure, a controlling method of an electronic apparatus, includes displaying at least one sentence, when receiving a user input regarding at least one character of the at least one sentence that is displayed, analyzing the at least one sentence by using the at least one sentence including at least one character and the at least one character, selecting a character set included in the at least one sentence according to an analysis result, and displaying a selected character set to be distinguished from other characters included in the at least one sentence.

According to another aspect of the disclosure, a computer-readable recording medium stores therein instructions to be executed on a computer to display at least one sentence, when receiving a user input regarding at least one character of the at least one sentence that is displayed, analyze the at least one sentence by using the at least one sentence including at least one character and the at least one character, select a character set included in the at least one sentence according to an analysis result, and display a selected character set to be distinguished from other characters included in the at least one sentence.

MODE OF DISCLOSURE

As the disclosure allows for various changes and numerous embodiments, embodiments will be illustrated in the drawings and described in detail in the written description. However, this is not intended to limit the disclosure to particular modes of practice, and it is to be appreciated that various modifications, equivalents, and/or alternatives that do not depart from the spirit and technical scope of the disclosure are encompassed in the disclosure. In the description of the disclosure, certain detailed explanations of the related art are omitted when it is deemed that they may unnecessarily obscure the essence of the disclosure.

In the specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the specification, the expressions such as "A or B," "at least one of A and/or B," or "at least one or more of A and/or B" may include all available combinations of items listed together. For example, the expressions such as "A or B," "at least one of A and B," or "at least one of A or B" may signify all cases of (1) including at least one A, (2) including at least one B, or (3) including both of at least one A and at least one B.

Terms such as "first" and "second" are used herein merely to describe a variety of constituent elements regardless of an order and/or importance and to distinguish one constituent element from another constituent element, but the constituent elements are not limited by the terms. For example, a first user device and a second user devise may denote different user devices regardless of an order and/or importance. For example, without departing from the right scope of the disclosure, a first constituent element may be referred to as a second constituent element, and vice versa.

Furthermore, terms such as "~module," "~unit," and "~part" stated in the specification may signify a unit to process at least one function or operation and the unit may be embodied by hardware, software, or a combination of hardware and software. Furthermore, a plurality of "modules", "units", "parts", etc. may be integrated in at least one module or chip to be realized as at least one processor, except for a case in which each of the modules, the units, and the parts needs to be realized by individual specific hardware.

In the specification, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element should be construed to be directly connected to another constituent element without any other constituent element, e.g., a third constituent element, interposed therebetween.

Terms used in the specification are used for explaining a specific embodiment, not for limiting the disclosure. Thus, an expression used in a singular form in the specification also includes the expression in its plural form unless clearly specified otherwise in context. Unless defined otherwise, all terms used herein including technical or scientific terms have the same meanings as those generally understood by those of ordinary skill in the art to which the disclosure may pertain. The terms as those defined in generally used dictionaries are construed to have meanings matching that in the context of related technology and, unless clearly defined otherwise, are not construed to be ideally or excessively formal. In some cases, even the terms defined herein may not be interpreted to exclude the embodiments of the disclosure.

Figure 1B:
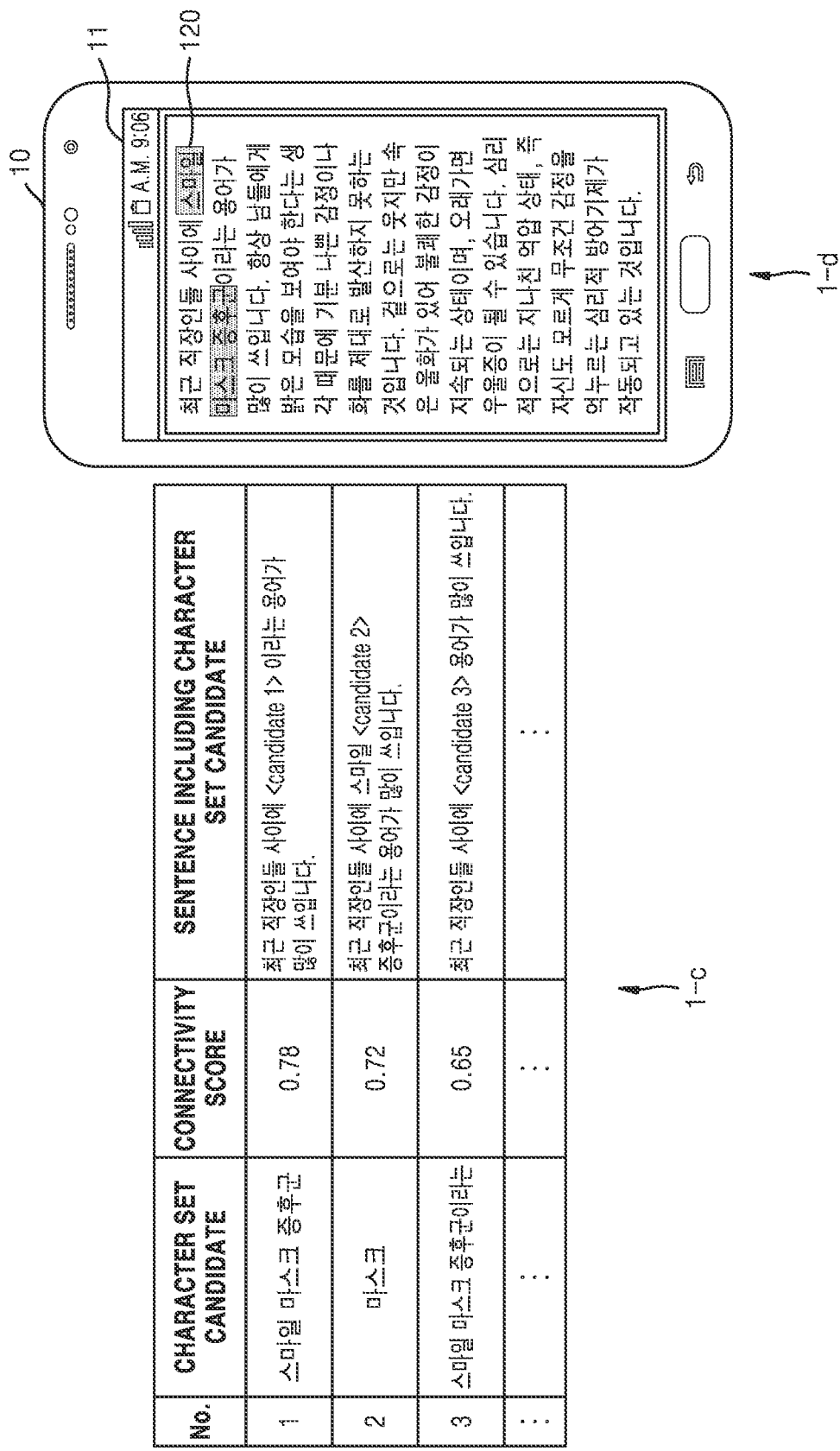

FIGS. 1A and 1B illustrate a state in which a plurality of characters are identified and displayed according to a user's selection on an electronic apparatus according to an embodiment.

According to an embodiment, an electronic apparatus 10 may display various contents on a display 11. For example, the electronic apparatus 10 may display contents such as image, video, text, or the like, on the display 11. The display 11 may include a touch screen display. The electronic apparatus 10, in response to a user input to select various contents displayed on the display 11, may provide new information related to the selected content, or identify a part of the selected content and provide a user with the identified part separately from the other part of the content.

Referring to identification number 1-*a* of FIG. 1A, the electronic apparatus 10 may display characters on the display 11.

For example, the electronic apparatus 10 may display characters on the display 11 by executing a document file stored in the electronic apparatus 10, for example, word document files, portable document format (PDF) files, or the like. For example, an operating system (OS) running on the electronic apparatus 10 may control a word file execution application that may execute a word document file to execute a word document file selected by a user to be displayed on the display 11.

Alternatively, the electronic apparatus 10 may display characters on the display 11 by accessing a web server to download online magazines, online newspapers, or the like. For example, the OS running on the electronic apparatus 10 may download online magazines, online newspapers, or the like, in the form of a file format, from a web server. The OS may control an execution application capable of executing a downloaded file to execute a document file to be displayed on the display 11.

Alternatively, as a web server accesses the electronic apparatus 10 to control the display 11 of the electronic apparatus 10, online magazines, online newspapers, or the like on the web server may be displayed.

Referring to identification number 1-*b* of FIG. 1*a*, the electronic apparatus 10 may receive a user input 105 to select at least one of the characters displayed on the display 11.

According to an embodiment, a user may select at least one character to conduct an additional search for a specific word, a specific phrase, a specific clause, or a specific sentence included in an article displayed on the display 11. The example, the electronic apparatus 10 may receive a user touch input 105 to select a character, that is, an "스" 112, from a word, that is, a "마스크" 110, displayed on the display 11. According to an embodiment, the user touch input 105 may be a long touch input of touching the "스" 112 for a preset time or more, or a multiple touch input of touching the "스" 112 a plurality of times within a set time. However, the user touch input 105 is not limited thereto.

According to various embodiments, the electronic apparatus 10 may receive an input of selecting the "스" 112 from the word, that is, the "마스크" 110, as a user manipulates physical keys included in the electronic apparatus 10.

According to an embodiment, the electronic apparatus 10, in response to a user input to select at least one of the characters displayed on the display 11, may analyze a sentence including at least one character by using the sentence and the at least one character, and select a character set included in the sentence according to an analysis result.

For example, the electronic apparatus 10 may obtain a plurality of character set candidates including the character selected corresponding to the user input and at least one of the neighboring characters, obtain a plurality of candidate sentences respectively corresponding to a plurality of character set candidates, analyze the obtained candidate sentences, select one candidate sentence, and select a character set corresponding to the selected one candidate sentence.

In detail, the electronic apparatus 10, in response to a user selection, may obtain a character set including the selected character and at least one of the neighboring characters.

Obtaining a character set may mean, for example, determining one character set including a selected character and characters present within a preset distance from the selected character. The electronic apparatus 10 may obtain a plurality of character set candidates by repeatedly performing the operation of obtaining a character set.

For example, the electronic apparatus 10 may determine "스크", "마스", "마스크", "마스크 중", "일 마스크", and the like, including the "스" 112 that is the character selected by a user, to be character set candidates.

According to an embodiment, the electronic apparatus 10 may obtain a plurality of candidate sentences respectively corresponding to a plurality of character set candidates, analyze the obtained candidate sentences, select one candidate sentence, and select a character set corresponding to the selected one candidate sentence.

For example, the electronic apparatus 10 may obtain the connectivity score of the character set candidates by analyzing the obtained candidate sentences.

Analyzing a sentence may mean, for example, that the electronic apparatus 10 analyzes a correlation between characters or words forming a sentence. Alternatively, analyzing a sentence may mean, for example, an operation of identifying whether relations between characters or words forming a sentence are continuous or non-continuous. Alternatively, analyzing a sentence may mean, for example, analyzing grammatical relations between characters or words forming a sentence. Alternatively, analyzing a sentence may mean, for example, analyzing grammatical roles of characters or words forming a sentence. Alternatively, analyzing a sentence may mean performing the above-described analysis processes sequentially or simultaneously.

According to an embodiment, the connectivity score may be a score given to a character set as a result of analysis of the above-described sentence. For example, the connectivity score may be a score given to a character set as the electronic apparatus 10 calculates a degree of connectivity in relations between the character set and other characters in a candidate sentence.

For example, the electronic apparatus 10 may obtain "최근 직장인들 사이에 스마일 증후군이라는 용어가 많이 쓰입니다." that is a candidate sentence including the "스" 112 that is the character selected by a user. The operation of obtaining a candidate sentence including the character selected by a user may mean, for example, determining a candidate sentence by using an artificial intelligence (AI) model trained to distinguish a boundary between sentences by using closing words for terminating a sentence.

The electronic apparatus 10 may obtain a plurality of characters including the "스" 112 in a range of the obtained candidate sentence, as one character set. For example, the electronic apparatus 10 may determine "스크", "마스", "마스크", "마스크 중", "일 마스크", or the like, including the "스" 112 that is the character selected by a user, to be one character set. However, the disclosure is not limited thereto. For example, the electronic apparatus 10 may obtain a plurality of characters including the "스" 112 beyond the range of the obtained candidate sentence, to be one character set. In this case, the electronic apparatus 10 may exclude a character set that does not form a word, from the obtained character sets.

For example, as in identification number 1-*c* of FIG. 1*b*, the electronic apparatus 10 may obtain " 스마일 마스크

증후군" as a first character set candidate. Furthermore, the electronic apparatus 10 may obtain " 마스크" as a second character set candidate and " 스마일 마스크 증후근이라는 " as a third character set candidate.

According to various embodiments, the electronic apparatus 10 may obtain, for example, the first character set candidate, the second character set candidate, and the third character set candidate, and combine the obtained character set candidates with another character in a sentence to generate a new character set candidate.

According to an embodiment, the electronic apparatus 10 may obtain a connectivity score with respect to a plurality of character set candidates on the basis of the analysis of a candidate sentence including the obtained character set. For example, when the obtained character set candidate is substituted with other words, the electronic apparatus 10 may distinguish whether the substituted word has independency or dependency in relation with other words or characters included in the sentence.

According to an embodiment, the electronic apparatus 10 may select one character set from among a plurality of character set candidates according to the connectivity score. The one character set selected by the electronic apparatus 10 may be, for example, a character set having a high connectivity score according to a result of the analysis of a sentence. A character set having a high connectivity score may be, for example, a character set that is highly likely to be selected by a user.

In detail, the electronic apparatus 10 may apply a work "감기약" to a sentence instead of the first character set candidate, the second character set candidate, and the third character set candidate.

For example, as the connectivity score is closer to 1, it may mean that a candidate character set is highly likely to be used by being connected to other characters included in a candidate sentence. Furthermore, as the connectivity score is closer to 0, it may mean that a candidate character set is highly unlikely to be used by being connected to other characters included in a candidate sentence.

For example, the electronic apparatus 10 may apply the word "감기약", instead of the first character set candidate, to the candidate sentence, and obtain a candidate sentence "최근 직장인들 사이에 감기약이러 는 용어가 많이 쓰입니다."

The electronic apparatus 10 may apply the word "감기약", instead of the second character set candidate and the third character set candidate, to the candidate sentence, and obtain candidate sentences "최근 직장인들 사이에 스마일 감기약 증후군이라는 용어 가 많이 쓰입니다." and "최근 직장인들 사이에 감기약 용어기많이 쓰입니다."

The electronic apparatus 10 may identify " 스마일 감기약 증후근이라는 " to be a non-existent character set, though it is not grammatically incorrect in the candidate sentence, and give a connectivity score of 0.72.

The electronic apparatus 10 may identify " 사이에 감기약 용어가" to be a character set that is not much used, in which a postposition word is grammatically omitted in the candidate sentence, and give a connectivity score of 0.65.

The electronic apparatus 10 may identify " 감기약이라는 용어가" to be a character set that is combinable and has no grammatical error in the candidate sentence, and give a connectivity score of 0.78.

The electronic apparatus 10, on the basis of an identification result, may identify that " 스마일 마스크 증후군" that is the first character set candidate has the largest connectivity score. In other words, the connectivity score may mean a degree of fluency in terms of grammar or meaning of a substituted character set in connection with other character sets of a candidate sentence when one character set is substituted by another character set in the candidate sentence.

According to various embodiments, the electronic apparatus 10 analyzing a candidate sentence to obtain a connectivity score may be one of embodiments of the disclosure. For example, the electronic apparatus 10 may analyze a phrase to which a character set belongs, a clause to which a character set belongs, a paragraph to which a character set belongs, or a piece of document to which a character set belongs. In other words, the electronic apparatus 10 may analyze a plurality of characters forming a sentence, a phrase, a clause, a paragraph, or a document, and select one character set included in the characters.

Referring to identification number 1-d of FIG. 1b, the electronic apparatus 10 may display a selected area notification object on the display 11 to display the identified one character set to be distinguished from other characters.

For example, the electronic apparatus 10 may display an area 120 adjacent to a character set including the identified characters " 스마일 마스크 증후군" by changing the color of the area 120. However, the disclosure is not limited thereto. For example, the electronic apparatus 10 may display the characters " '스마일 마스크 증후군" in a color different from the color of other characters, or by changing the thickness of the characters.

According to various embodiments, while the area 120 adjacent to " 스마일 마스크 증후군" is displayed by changing the color thereof, the electronic apparatus 10 may receive a user input to select another character displayed on the display 11, for example, " 직" of " 직장인". In this case, the electronic apparatus 10 terminates displaying the area 120 adjacent to " 스마일 마스크 증후군" by changing the color thereof, and sequentially, display an area adjacent to " 직장인" by changing the color thereof.

As such, according to an embodiment of the disclosure, when a user tries to conduct an additional search or the like by selecting a word display on the display 11, inconvenience of adjusting a start point and an end point of each of a word, a phrase, and a clause to select a desired word, phrase, or clause may be reduced. For example, as described above, when a user selects one character only, a character set including the selected character and being highly likely to be selected by a user considering the meaning and/or structure of a sentence including the selected character is identified and displayed to be distinguished from other characters.

Figures 2, 3:
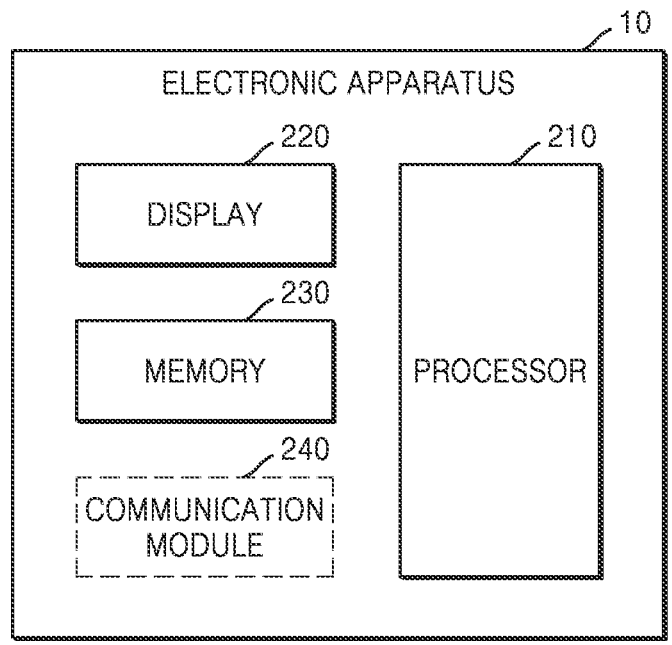
FIG. 2 is a schematic block diagram of an electronic apparatus according to an embodiment.
FIG. 3 illustrates a state in which generality scores of character sets are used to identify one of a plurality of character sets on an electronic apparatus according to an embodiment.

FIG. 2 is a schematic block diagram of an electronic apparatus according to an embodiment.

Referring to FIG. 2, the electronic apparatus 10 may include a processor 210, a display 220, and a memory 230. The electronic apparatus 10 may further include a communication module 240. However, the disclosure is not limited thereto. The electronic apparatus 10 may include more constituent elements or exclude some constituent elements to perform the function of the electronic apparatus 10.

According to an embodiment, the processor 210 may control the overall operation of the electronic apparatus 10. For example, the processor 210 may execute a stored program by controlling the memory 230, or retrieve or store necessary information.

According to an embodiment, the processor 210 may control the display 220 to display at least one sentence, receive a user input regarding at least one character of the displayed sentence, analyze the sentence by using the sentence including at least one character and the at least one character, in response to a user input, select a character set included in the sentence according to an analysis result, and display the selected character set to be distinguished from other characters included in the sentence.

According to various embodiments, the electronic apparatus 10 may include a plurality of processors. For example, the electronic apparatus 10 may include a general-purpose processor and an AI dedicated processor.

The AI dedicated processor may be, for example, a processor that is more integrated, has less delay, has better performance, or more resources than a general-purpose processor.

According to an embodiment, the AI processor may quickly and efficiently process a large amount of calculation needed for generation, updating, or application of an AI model, compared with the general-purpose processor.

According to an embodiment, the general-purpose processor may control the display 220 to display at least one sentence, receive a user input to select at least one character of the displayed sentence, and select a sentence including the selected character.

The AI processor may receive a selected character and a sentence including the selected character from a general-purpose processor, analyze a sentence by using the selected character and a sentence including the selected character, select a character set included in the sentence according to an analysis result, and transmit the selected character set to the general-purpose processor. For example, the AI processor may obtain a plurality of candidate character sets including a selected character, produce a connectivity score with respect to the candidate character sets, and select one character set.

The general-purpose processor may display a received character set to be distinguished from other characters.

However, the operation performed by each processor is not limited thereto. For example, the electronic apparatus 10 may allow each processor to separately perform operations in various forms.

According to an embodiment, the display 220 may display an image, a video, text, and/or an execution screen of an application. When the display 220 is implemented by a touch screen display, the display 220 may be used as an input device in addition to an output device. The display 220 may include at least one of a liquid crystal display, a thin film transistor-liquid crystal display, an organic light-emitting diode, a flexible display, a 3D display, an electrophoretic display, and the like.

According to an embodiment, the display 220 may display at least one sentence and receive a user input to select at least one character included in the displayed sentence, under the control of the processor 210. Furthermore, the display 220 may, under the control of the processor 210, display a set of the identified characters to be distinguished from other characters.

According to an embodiment, the memory 230 may include at least one type of storage media such as a flash memory, a hard disk, a multimedia card micro, a card type memory, for example, SD or XD memory, random access memory (RAM), static random access memory (SRAM), read-only memory (ROM), electrically erasable programmable ROM (EEPROM), programmable ROM (PROM), a magnetic memory, a magnetic disc, an optical disc, and the like.

According to an embodiment, the memory 230 may store instructions which are configured such that the processor 210 controls the display 220 to display at least one sentence, receive a user input regarding at least one character of the displayed sentence, analyze, in response to a user input, a sentence by using at least one character and a sentence including the at least one character, select a character set included in the sentence according to an analysis result, and display the selected character set to be distinguished from other characters included in the sentence.

According to an embodiment, the communication module 240 may connect the electronic apparatus 10 to an external device, for example, a server, another electronic apparatus, under the control of the processor 210. The communication module 240 may include one of the constituent elements implementing various wired or wireless communication methods such as wireless local area network (LAN), Bluetooth, and wired Ethernet, or the like, according to the performance and structure of the electronic apparatus 10.

FIG. 3 illustrates a state in which generality scores of character sets are used to identify one of a plurality of character sets on an electronic apparatus according to an embodiment.

According to an embodiment, the electronic apparatus 10 may calculate a generality score considering how frequently a character set including a word, a phrase, or a clause is used in a sentence, a paragraph, or a document, and store the generality scores in the memory 230 as a database. The generality score may be a score used to determine whether a character set in a sentence, a paragraph, or a document is highly likely to be selected by a user for search.

For example, the generality score may be determined considering at least one of the frequency of use of a character set, a degree of importance of a character set, and a possibility of an additional search using a character set. However, the factors to be considered in determining the generality score are not limited thereto.

The generality score may be determined, for example, according to whether a user is more likely to select a character set to get additional information because, although the character set is usually less frequently used in a sentence, a paragraph, or a document, when used in a sentence, a paragraph, or a document, the character set has an important meaning and thus is used as an important meaning in the sentence, the paragraph, or the document.

The generality score may be determined, for example, according to whether many people are likely to conduct a search for additional information regarding a character set because, although the character set is usually less frequently used in a sentence, a paragraph, or a document, when used in a sentence, a paragraph, or a document, many people are curious for the character set.

The generality score may be close to 1, for example, as the frequency is relatively high and a probability of searching for additional information is relatively low. Furthermore, the generality score may be close to 0 as the frequency is relatively low and a probability of searching for additional information is relatively high.

Referring to identification number 3-*a* of FIG. 3, the electronic apparatus 10 may store a generality score with respect to a character set including a word, a phrase, or a clause. For example, the electronic apparatus 10 may give 0.73456 point to "스마일", 0.52679 points to "마스크", 0.41181 points to "증후군", 0.01220 points to "스마일 마스크 증후군" on the basis of a plurality of sentences or documents collected as data and classified into a plurality of character sets.

Referring to identification number 3-*b* of FIG. 3, the electronic apparatus 10 may identify "최근 직장인들 사이에 스마일 마스크 증후군이 리는 용어가 많이 쓰입니다." that is a sentence including "스" that is a character selected by a user. The electronic apparatus 10 may obtain a plurality of characters including "스" in the sentence, as one character set. Furthermore, the electronic apparatus 10 may obtain a character set adjacent to the character set including "스" in the sentence. For example, the electronic apparatus 10 may obtain "스마일", "마스크", "증후군", and "스마일 마스크 증후군" as a candidate character set.

According to an embodiment, the electronic apparatus 10 may identify "스마일 마스크 증후군" as a character set having a low frequency and a high probability of searching for additional information on the basis of the generality score to the obtained plurality of candidate character sets.

The electronic apparatus 10, as illustrated in identification number 1-*d* of FIG. 1*b*, may display the selected area notification object 120 on the display 11 to display the identified character set to be distinguished from other characters.

Figure 4:
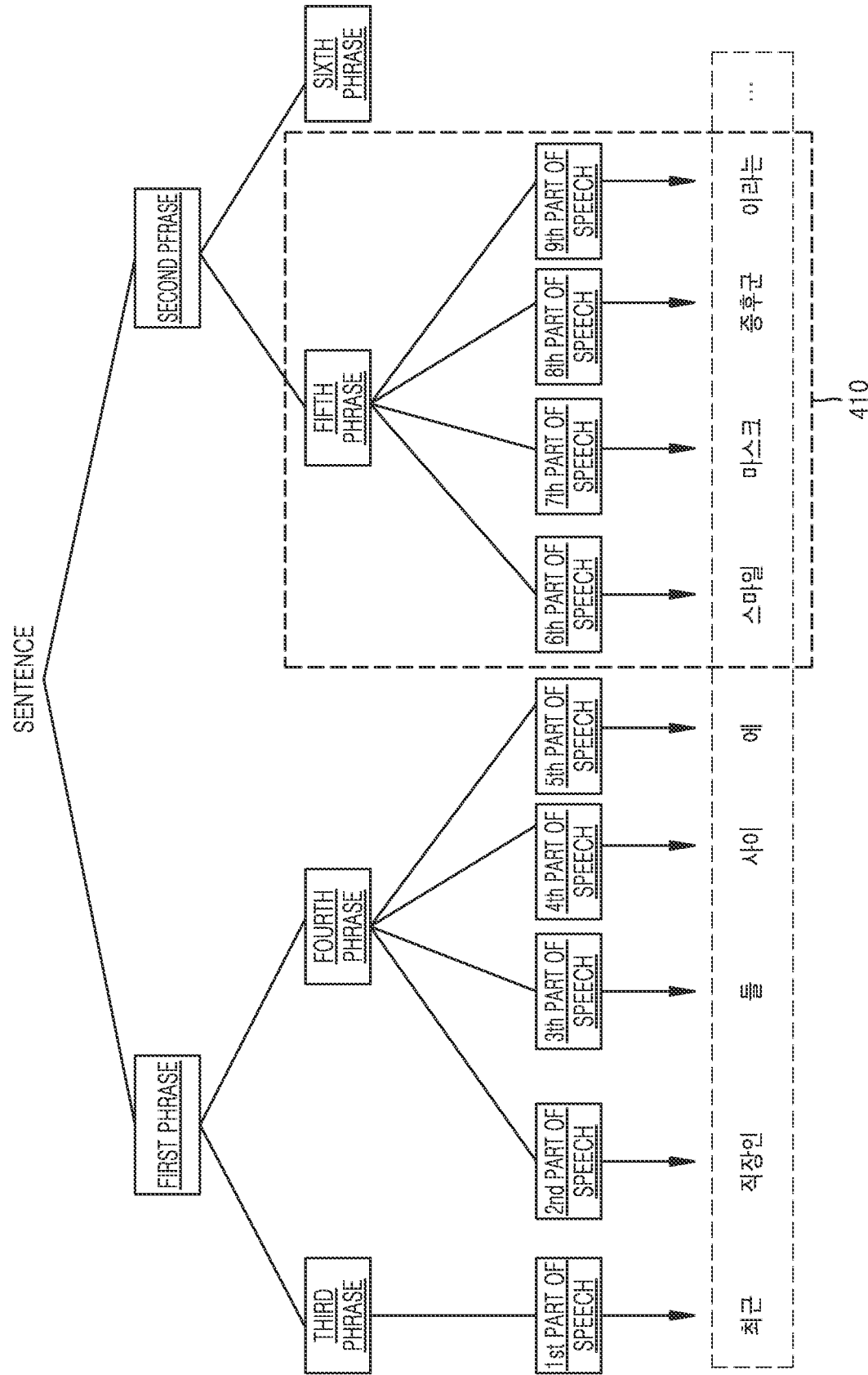
FIG. 4 illustrates a state in which an electronic apparatus according to an embodiment identifies a character set including a plurality of characters by using a grammatical structure of a sentence.

FIG. 4 illustrates a state in which an electronic apparatus according to an embodiment identifies a character set including a plurality of characters by using a grammatical structure of a sentence According to an embodiment, the electronic apparatus 10 may classify sentence constituent elements of a sentence including a character selected by a user according to grammatical characteristics of the sentence constituent elements. The electronic apparatus 10 may store a sentence analysis algorithm on the memory 230, the sentence analysis algorithm being able to hierarchically classify sentence constituent elements, such as a word, a phrase, or a clause, included in one sentence by using, for example, a tree structure, to a level of a noun, a postpositional word, or a suffix.

The electronic apparatus 10 may hierarchically classify a word, a phrase, or a clause in a sentence by grammatically analyzing an identified sentence. For example, the electronic apparatus 10 may identify at least one of a noun phrase, a verb phrase, an adjective phrase, and an adverb phrase from the identified sentence. Furthermore, the electronic apparatus 10 may identify the part of speed of characters sets classified from the identified sentence. The part of speech identified by the electronic apparatus 10 may include, for example, a general noun, a suffix, and a postpositional word, but not limited thereto.

For example, the electronic apparatus 10 may identify "최근 직장인들 사이에 스마일 마스크 증후군이 라는 용어가 많이 쓰입니다." that is a sentence including "스" that is a character selected by a user. The electronic apparatus 10 may grammatically analyze the identified sentence.

For example, the electronic apparatus 10 may identify "최근 직장인들 사이에" as a first phrase in the sentence. Furthermore, the electronic apparatus 10 may identify "스마일 마스크 증후군이라는" as a second phrase.

The electronic apparatus 10 may identify "최근" in the first phrase "최근 직장인들 사이에" as a third phrase, and the part of speech of "최근" as a first part of speech. The electronic apparatus 10 may identify "직장인들 사이에" as a fourth phrase, and the part of speech of "직장인" as a second part of speech, the part of speech of "들" as a third part of speech, the part of speech of "사이" as a fourth part of speech, and the part of speech of "에" as a fifth part of speech. For example, the third phrase may be a noun phrase, and the fourth phrase is a noun phrase. For example, the first part of speech may be a general noun, the second part of speech may be a general noun, the third part of speech may be a noun-derived suffix, the fourth part of speech may be a general noun, and the fifth part of speech may be a postpositional word.

The electronic apparatus 10 may identify "the term of 스마일 마스크 증후군이라는" as a fifth phrase. The electronic apparatus 10 may identify, from the fifth phrase of "스마일 마스크 증후군", the parts of speech of "스마일", "마스크", and "증후군" as the sixth part of speech, the seventh part of speech, and the eighth part of speech, respectively, and the part of speech of "이라는" as the ninth part of speech. For example, the fifth phrase may be a noun phrase of an adjective case. For example, the sixth part of speech, the seventh part of speech, and the eighth part of speech may be general nouns, and the ninth part of speech may be a postpositional word.

According to an embodiment, the electronic apparatus 10 may identify character sets included in a tree structure 410 that is the smallest level, to which the character selected by a user belongs to. For example, the electronic apparatus 10 may identify "스마일 마스크 증후군이라는" as a character set that is highly likely to be selected by a user.

According to various embodiments, the electronic apparatus 10 may identify, as a character set, only a portion consisting of nouns except a postpositional word portion in the identified character set. For example, the electronic apparatus 10 may identify "스마일 마스크 증후군" of "스마일 마스크 증후군이라는", except "이라는" that corresponds to a postpositional word, as a character set that is highly likely to be selected by a user.

Figure 5:
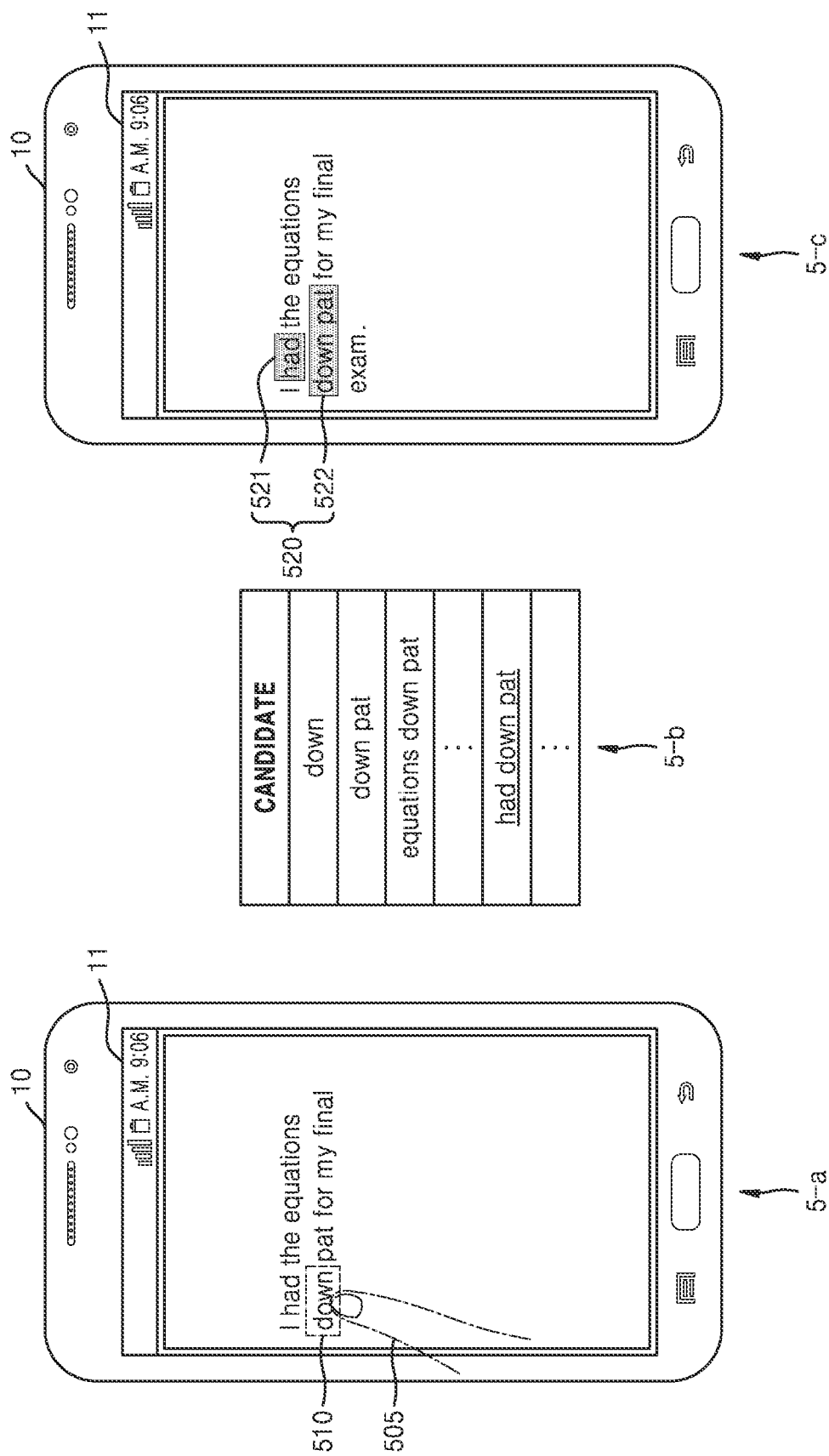
FIG. 5 illustrates a state in which an electronic apparatus identifies a character set including a plurality of characters that are not adjacent to each other.

FIG. 5 illustrates a state in which an electronic apparatus identifies a character set including a plurality of characters that are not adjacent to each other.

Referring to identification number 5-*a* of FIG. 5, the electronic apparatus 10 may display characters on the display 11. The characters may be, for example, a part of a newspaper article displayed on a web browser. However, the characters may not be limited to a newspaper article, and may include various contents using the characters.

According to an embodiment, the electronic apparatus 10 may receive a user input 505 to select at least one of the characters displayed on the display 11.

According to an embodiment, the user may select at least one character to conduct an additional search for a specific word, a specific phrase, a specific clause, or a specific sentence included in the article displayed on the display 11. For example, the electronic apparatus 10 may receive a user touch input to select a word 510 "down" displayed on the display 11.

Referring to identification number 5-b of FIG. 5, the electronic apparatus 10 may obtain a plurality of character set candidates, by repeating an operation of obtaining a character set including a character selected in response to a user selection and at least one of neighboring characters. Furthermore, the electronic apparatus 10 may obtain a plurality of candidate sentences respectively corresponding to the obtained character set candidates, analyze the obtained candidate sentences to select one candidate sentence, and identify a character set corresponding to the selected one candidate sentence as a character set that is highly likely to be searched for additional information by a user.

For example, the electronic apparatus 10 may obtain "I had the equations down pat for my final exam" that is a sentence including "down" that is a character selected by a user. The electronic apparatus 10 may obtain a plurality of characters including "down" as one character set.

For example, the electronic apparatus 10 may obtain a plurality of character set candidates including "down", "down pat", "equations down pat", or "had down pat". In this case, the electronic apparatus 10 may obtain, as a character set candidate, a character set including characters that are not directly adjacent to a selected character such as "had down pat".

According to an embodiment, the electronic apparatus 10 may analyze a sentence including the obtained character set and a sentence including the obtained character by using the obtained character, and identify one character set from a plurality of character set candidates.

For example, when a character set candidate is substituted by other words, the electronic apparatus 10 may identify a sentence having appropriate sentence structure and meaning and thus identify one of a plurality of character set candidates as a character set that is highly likely to be selected by a user for search.

For example, the electronic apparatus 10 may identify one character set by using a search history made by a user using the electronic apparatus 10. Alternatively, the electronic apparatus 10 may identify one character set of a plurality of character set candidates by using the generality scores of character sets. Alternatively, the electronic apparatus 10 may identify one character set of a plurality of character set candidates by using the grammatical structure of a sentence.

Referring to the identification number 5-b of FIG. 5, the electronic apparatus 10 may identify "had down pat" of a plurality of character set candidates as a character set that is highly likely to be selected by a user for search. For example, the electronic apparatus 10 may identify "had down pat" as an idiom by using the grammatical structure, and identify "had down pat" as a character set that is highly likely to be searched for additional information because, although the character set is less frequently used, when used in a sentence, the character set has an important meaning.

Referring to identification number 5-c of FIG. 5, the electronic apparatus 10 may display a selected area notification object on the display 11 to display the identified one character set to be distinguished from other characters.

For example, the electronic apparatus 10 may display the color of an area 520 including an area 521 adjacent to "had" and an area 522 adjacent to "down pat" to be different from a neighboring color, with respect to a character set including the identified characters "had down pat". However, the disclosure is not limited thereto. For example, the electronic apparatus 10 may display characters "had down pat" in a color different from other characters, or by changing the thickness of the characters.

FIG. 6 illustrates a state in which a search history is used to identify one of a plurality of character sets on an electronic apparatus according to an embodiment.

According to an embodiment, the electronic apparatus 10 may store a search history made by a user using the electronic apparatus 10 in the memory 230 as a database. For example, the electronic apparatus 10 may display a web browser capable of information search in response to a user input, on the display 11. A user may input a word, a phrase, a clause, or a sentence to be searched for by using a web browser including a search window, and check a search result.

According to an embodiment, when a plurality of characters including a character selected corresponding to a user selection are obtained as one character set, the electronic apparatus 10 may use a previously stored search history.

For example, in the identification number 1-c of FIG. 1b, the electronic apparatus 10 may obtain "스마일 마스크 증후군" as the first character set candidate. Furthermore, the electronic apparatus 10 may obtain "마스크" as the second character set candidate, and "스마일 마스크 증후군이라는" as the third character set candidate.

The electronic apparatus 10 may analyze a sentence including the obtained character set by using the sentence including the obtained character set and the obtained character set, and when one of a plurality of character sets is to be identified, check the search history previously stored in the electronic apparatus 10.

Referring to FIG. 6, the electronic apparatus 10 may check from the search history that a character set "우울증" was input on Apr. 11, 2018, at 13:34, and a search result thereof was provided. Furthermore, the electronic apparatus 10 may check from the search history that a character set "번아웃 증후군" was input on Apr. 11, 2018, at 11:27, and a search result thereof was provided.

According to an embodiment, the electronic apparatus 10 may identify the first character set candidate "스마일 마스크 증후군" that matches the name of disease in the first to third character set candidates, as a character set that is highly likely to be selected by a user for search, by using a history that a user input a character set related to a disease.

FIG. 7 illustrates a state in which an electronic apparatus selects a search category considering the content of a sentence.

According to an embodiment, the electronic apparatus 10 may use a content of a sentence including a character selected by a user in a state in which a search is conducted in a web browser by using the identified character set. The electronic apparatus 10 may determine a search category in the sentence including the character selected by a user, on the basis of the meaning of the identified character set and other words. In this case, the other words used to determine a search category may be determined on the basis of, for example, a close relation with the identified character set, the type of a part of speech, importance in a sentence, or the like. Furthermore, the electronic apparatus 10 may determine a search category considering the contents of neighboring sentences of the sentence including the character selected by a user.

For example, the electronic apparatus 10 may identify "해리포터" as a character set that is highly likely to be selected by a user, in response that a user selects "포" of "해리포터" that is a word included in the first sentence. When a user requests a search for "해리포터", the electronic apparatus 10 may conduct a search through a web browser. In this case, the electronic apparatus 10 may first conduct a search in the category related to books or novels regarding a search range by referring to a word such as "작가" or "조엔롤링" included in the first sentence.

According to an embodiment, the electronic apparatus 10 may identify "해리포터" as a character set that is highly likely to be selected by a user, in response that a user selects "포" of "해리포터" that is a word included in the second sentence. When a user requests a search for "해리포터", the electronic apparatus 10 may conduct a search through a web browser. In this case, the electronic apparatus 10 may first conduct a search in the category related to amusement parks regarding a search range by referring to a word such as "유니버설 스튜디오", or "놀이" included in the second sentence.

According to an embodiment, the electronic apparatus 10 may identify "해리포터" as a character set that is highly likely to be selected by a user, in response that a user selects "포" of "해리포터" that is a word included in the third sentence. When a user requests a search for "해리포터", the electronic apparatus 10 may conduct a search through a web browser. In this case, the electronic apparatus 10 may first conduct a search in the category related to movies regarding a search range by referring to a word such as "연기", "다니엘 래드클리프" included in the second sentence.

As such, according to an embodiment of the disclosure, the electronic apparatus 10 may provide a search result suitable for a user's intension considering the content of the sentence where a character set is located.

Figure 8:
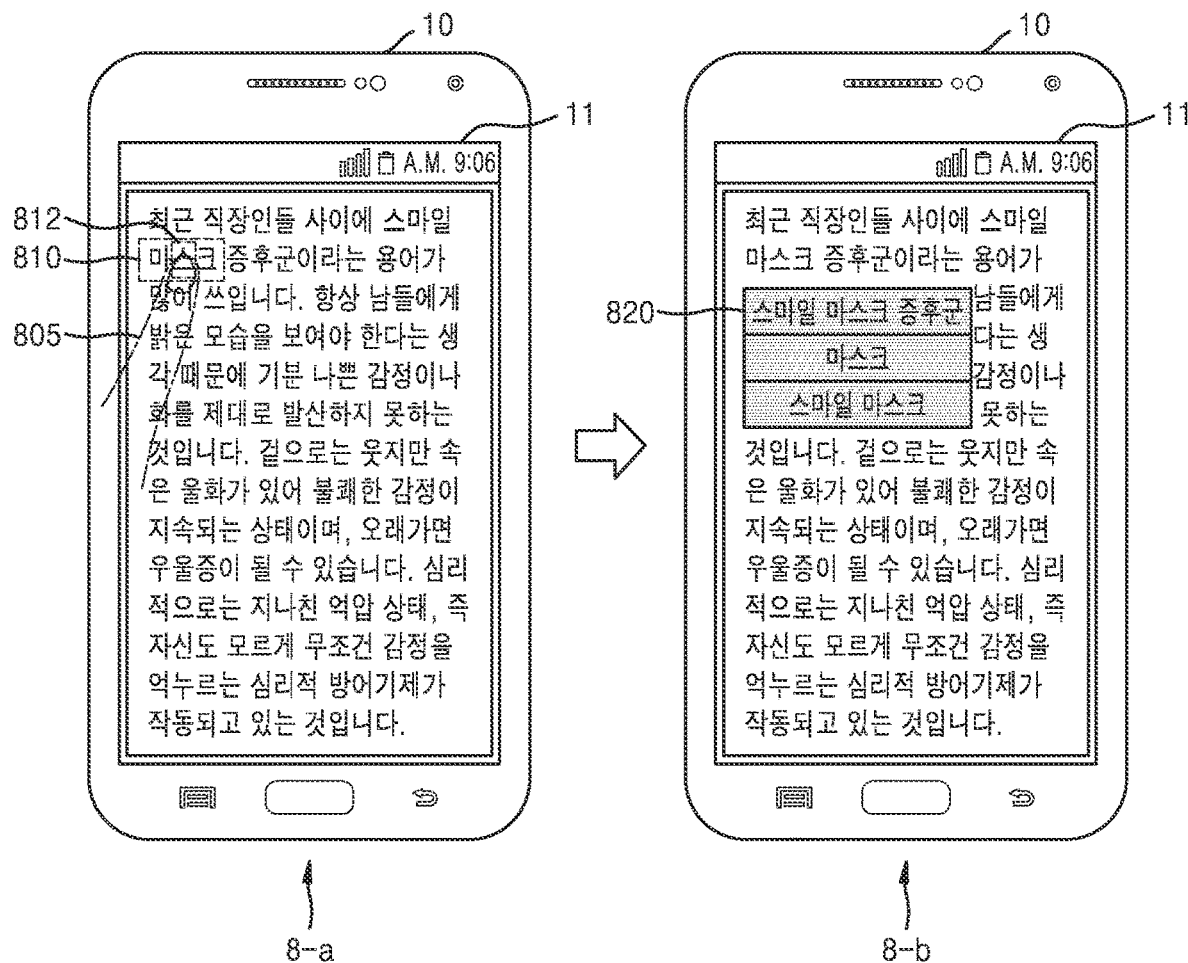
FIG. 8 illustrates an embodiment in which an electronic apparatus according to an embodiment displays a selected area notification object.

FIG. 8 illustrates an embodiment in which an electronic apparatus according to an embodiment displays a selected area notification object.

Referring to identification number 8-*a* of FIG. 8, the electronic apparatus 10 may display characters on the display 11. The characters may be, for example, a part of a newspaper article displayed on a web browser. However, the characters are not limited to a newspaper article, and may include various contents using the characters.

According to an embodiment, the electronic apparatus 10 may receive a user input 805 to select at least one of the characters displayed on the display 11.

According to an embodiment, a user may select at least one character to conduct an additional search for a specific word, a specific phrase, a specific clause, or a specific sentence included in the article displayed on the display 11. For example, the electronic apparatus 10 may receive a user touch input to select "스" 812 of a word "마스크" 810 displayed on the display 11.

Referring to identification number 8-*b* of FIG. 8, the electronic apparatus 10 may obtain a plurality of character sets by repeating an operation of obtaining a plurality of characters including a selected character, as one character set, in response to a user selection.

For example, the electronic apparatus 10 may obtain "최근 직장인들 사이에 스마일 마스크 증후군이 라는 용어가 많이 쓰입니다." that is a sentence including "스" 812 that is a character selected by a user. The electronic apparatus 10 may obtain a plurality of characters including the "스" 812, as one character set.

For example, the electronic apparatus 10 may obtain "스마일 마스크 증후군" as a first character set candidate. Furthermore, the electronic apparatus 10 may obtain "마스크" as a second character set candidate, and "스마일 마스크" as a third character set candidate.

According to an embodiment, the electronic apparatus 10 may display character set candidates on the display 11 and identify one of the character set candidates as a character set on which a user conducts an additional information search based on a user selection.

For example, the electronic apparatus 10 may display a candidate list including the first to third character set candidates in the form of a pop-up window 820 on the display 11. The electronic apparatus 10 may display a selected character set to be distinguished from other characters, according to a user input to select one of the displayed character set candidates.

Figure 9:
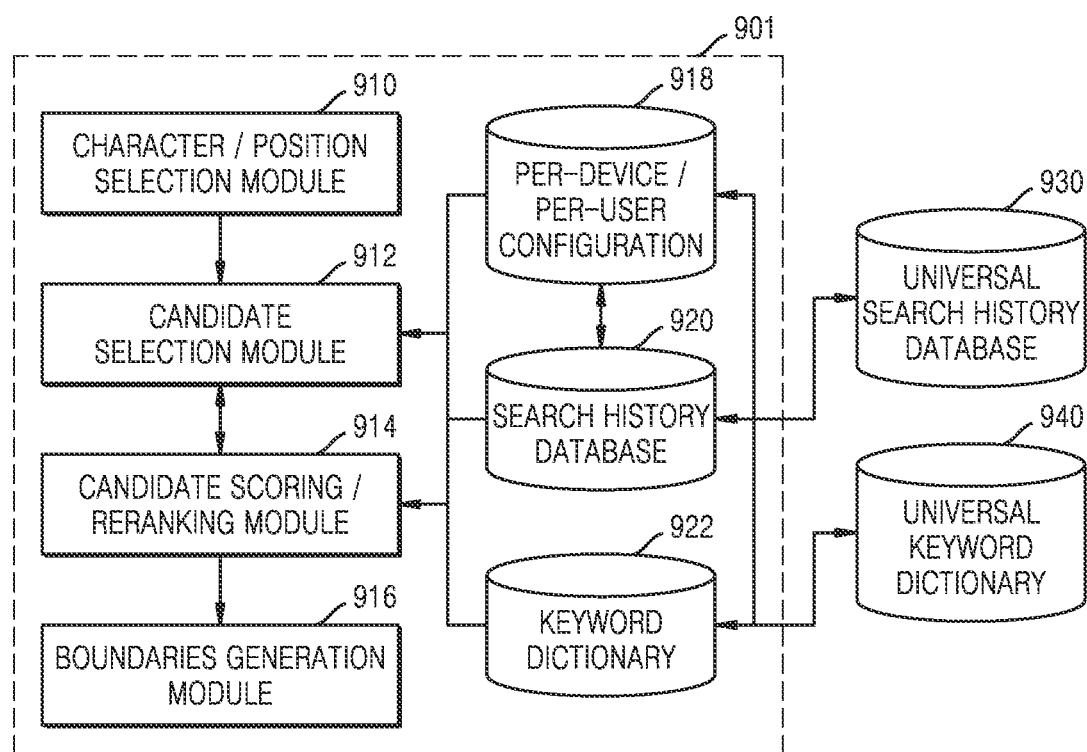
FIG. 9 is a block diagram of an electronic apparatus according to various embodiments.

FIG. 9 is a block diagram of an electronic apparatus according to various embodiments.

Referring to FIG. 9, an electronic apparatus 901 may include a character/position selection module 910, a candidate selection module 912, a candidate scoring/reranking module 914, a boundaries generation module 916, a per-device/per-user configuration 918, a search history database 920, and a keyword dictionary 922. The electronic apparatus 901 may include the electronic apparatus 10 of FIG. 1*a*.

According to an embodiment, the character/position selection module 910 may receive a user input a user input to select a character from a sentence. The character/position selection module 910 may obtain a position of a selected character in a sentence or a relative position in a sentence.

According to an embodiment, the candidate selection module 912 may obtain a character set including the selected character and at least one of the neighboring characters. The candidate selection module 912 may obtain a plurality of character sets by repeatedly performing the process.

According to an embodiment, the candidate scoring/reranking module 914 may obtain a plurality of candidate sentences respectively corresponding to the obtained character sets, and analyze the obtained candidate sentences. For example, the candidate scoring/reranking module 914 may analyze the meaning of a candidate sentence and give a connectivity score.

According to various embodiments, the candidate scoring/reranking module 914 may transmit the obtained result to the candidate selection module 912. The candidate selection module 912 may perform again the process of obtaining a plurality of characters including a selected character as one character set by reflecting a transmitted result.

According to an embodiment, when performing the above-described operation, the candidate selection module 912 and the candidate scoring/reranking module 914 may use data received from the search history database 920 and the keyword dictionary 922.

For example, the search history database 920 may store a search history searched by a user using the electronic apparatus 901. When performing the operations of obtaining and identifying a character set, the candidate selection module 912 and the candidate scoring/reranking module 914 may give a weight to a character set related to a field in which a user of the electronic apparatus 901 is usually interested in, by referring to the search history received from the search history database 920.

Furthermore, the keyword dictionary 922 may store a generality score with respect to a character set. When performing the operations of obtaining and identifying a character set, the candidate selection module 912 and the candidate scoring/reranking module 914 may give a weight to a character set that is less frequently used, but has an important meaning, by referring to the generality score received from the keyword dictionary 922.

The per-device/per-user configuration 918 may store basic information of the electronic apparatus 901. The basic information may include, for example, the memory capacity, CPU power, display size, or the like of the electronic apparatus 901. The electronic apparatus 10 may adjust the amount of data stored in the search history database 920 and the keyword dictionary 922 according to the basic information. Alternatively, when diving a connectivity score to a character set, the electronic apparatus 10 may adjust a range of data in use of the data stored in the search history database 920 and the keyword dictionary 922, according to the basic information.

According to various embodiments, the electronic apparatus 901 may receive and use data from an external device. For example, the electronic apparatus 901 may receive a specific search history used by a plurality of users from a universal search history database 930 and use the specific search history when giving a connectivity score to a character set.

Alternatively, the electronic apparatus 901 may receive a generality score from a universal keyword dictionary 940 and use the generality score when giving a connectivity score to a character set.

According to various embodiments, the character/position selection module 910, the candidate selection module 912, the candidate scoring/reranking module 914, and the boundaries generation module 916 may be terms referring to constituent elements performing at least one function or operation. Accordingly, these constituent elements may be stored in a memory, for example, the memory 230 of FIG. 2, in a combination of software or a combination of instructions, or implemented by a processor, for example, the processor 210 of FIG. 2.

According to various embodiments, the per-device/per-user configuration 918, the search history database 920, and the keyword dictionary 922 may correspond to the memory 230 of FIG. 2.

According to various embodiments, the universal search history database 930, and the universal keyword dictionary 940 may correspond to at least one server that establishes a communication with the electronic apparatus 901.

The function related to AI according to the disclosure may be operated through a processor and a memory. The processor may include one or a plurality of processors. In this state, one or a plurality of processors may include a general-purpose processor such as a central processing unit (CPU), an application processor (AP), a digital signal processor (DSP), or the like, a graphics dedicated processor such as a graphics processing unit (GPU) or a vision processing unit (VPU), or an AI dedicated processor such as neural processing unit (NPU). One or a plurality of processors may be controlled to process input data according to predefined operation rules or an AI model stored in a memory. Alternatively, when one or a plurality of processors are AI dedicated processors, the AI dedicated processor may be designed to have a hardware structure specified for processing a specific AI model.

The predefined operation rules or AI model is characteristically formed through learning. Being formed through learning may mean forming the predefined operation rules or AI model configured to perform a desired feature or purpose as a basic AI model is trained by a learning algorithm using a plurality of learning data. The learning may be performed in a device itself where AI according to the disclosure is performed or through a separate server and/or system. Examples of learning algorithms may include supervised learning, unsupervised learning, semi-supervised learning, or reinforcement learning, but not limited to the above-mentioned examples.

The AI model may include a plurality of neural network layers. Each of a plurality of neural network layers may have a plurality of weight values and perform a neural network operation through an operation result of a previous layer and operations between a plurality of weight values. A plurality of weight values of a plurality of neural network layers may be optimized by a learning result of an AI model. For example, a plurality of weight values may be updated so that a loss or cost value obtained by the AI model during a learning process is decreased or reduced. An artificial neural network may include a deep neural network (DNN), for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, or the like, but the disclosure is not limited thereto.

According to an embodiment, at least one AI model, for example, a connectivity identification model, a generality identification model, or a sentence analysis model, may be trained.

For example, when a plurality of sentences are input to an AI model, the AI model may be trained to estimate a word occurring next to a set of consecutive words constituting each of a plurality of sentences.

For example, consecutive word sets and words that are adjacent to each word set, or the like, are extracted from an arbitrary sentence, and the extracted word sets and words may be used as training data. Accordingly, the AI model may estimate a degree of a sentence being natural, for example, a connectivity score or a generality score.

Furthermore, according to various embodiments, when a plurality of sentences are input to an AI model, the AI model may be trained to estimate a plurality of words located at a preset distance from each of words constituting a plurality of sentences. Furthermore, when a plurality of sentences are input to an AI model, the AI model may be trained to estimate one word located at the same distance from words constituting a plurality of sentences.

For example, from a certain sentence, a plurality of words located at a preset distance from one word included in a sentence may be extracted, and the extracted words may be used as training data. Furthermore, from a certain sentence, one word located at the same distance from a plurality of words may be extracted and the extracted word may be used as training data.

The intrinsic directivity of each of words may be obtained by using a trained result, and the similarity of words, for example, a connectivity score or a generality score, may be estimated by using the directivity.

Furthermore, according to various embodiments, when a plurality of sentences and a sentence structure corresponding thereto are input to an AI model, the AI model may be trained to estimate the structure of the sentence constituting a plurality of sentences.

According to various embodiments, a connectivity identification model may be trained such that the connectivity identification model has a standard to identify a connectivity score of a character set included in a sentence or a piece of document. A connectivity identification model may be trained to have a standard regarding which training data is used for the connectivity identification model to obtain the connectivity score of a character set included in a sentence or a piece of document, or how the connectivity score of a character set included in a sentence or a piece of document is identified by using the training data.

According to various embodiments, a connectivity identification model may be trained by using a plurality of sentences or a plurality of documents as training data. For example, the training data may include all types of documents and sentences such as newspaper articles, editorials, novels, theses, or the like.

According to various embodiments, a trained connectivity identification model may obtain the connectivity score of a character set included in a sentence or a piece of document on the basis of various types of recognition data. The trained connectivity identification model may obtain the connectivity score of a character set from at least one sentence or document that is input.

According to various embodiments, a user's response, or feedback, to the connectivity score output from the connectivity identification model may be used to update the connectivity identification model. Accordingly, the connectivity identification model may increase a probability of obtaining the connectivity score of a character set according to the user's disposition.

According to various embodiments, a generality identification model may be trained to have a standard to obtain the generality score of a character set included in a sentence or a piece of document. The generality identification model may be trained to have a standard regarding which training data is used to obtain the generality score of a character set included in a sentence or a piece of document, or how the connectivity score of a character set included in a sentence or a piece of document is identified by using training data.

According to various embodiments, the generality identification model may be trained by using a plurality of sentences or a plurality of documents as training data. For example, the training data may include all types of sentences and documents such as newspaper article, editorials, novel, theses, and the like.

According to various embodiments, the trained generality identification model may obtain the generality score of a character set included in a sentence or a piece of document on the basis of various types of recognition data. The trained generality identification model may obtain the generality score of a character set from at least one sentence or document that is input.

According to various embodiments, a user's response to the generality score output from the generality identification model may be used to update the generality identification model. Accordingly, the generality identification model may increase a probability of obtaining the generality score of a character set according to the user's disposition.

According to various embodiments, a sentence analysis model may be trained to have a standard to classify constituent elements, for example, nouns, verbs, suffixes, postpositional words, or the like, included in a sentence. The sentence analysis model may be trained to have a standard regarding which training data is used to classify the constituent elements included in a sentence, or how the constituent elements included in a sentence are identified by using training data.

According to various embodiments, the sentence analysis model may be trained by using a result of classifying a sentence and words included in the sentence by using training data according to the constituent elements.

For example, the sentence analysis model may be trained by using a result of classifying a sentence "나는 학교에 간다", "나" that is a pronoun, "는" that is a postpositional word, "학교" that is a noun, "에" that is a postpositional word, and "간다" that is a verb.

According to various embodiments, the trained sentence analysis model may classify constituent elements included in a sentence on the basis of various types of recognition data. At least one constituent elements included in a sentence that is input may be classified by using the trained sentence analysis model.

According to various embodiments, a user's response to the result output from the sentence analysis model may be used to update the sentence analysis model.

For example, when a sentence "너는 멋지다." is input, the sentence analysis model may obtain a result of classification of "너" that is a pronoun, "는" is a postpositional word, and "멋지다" is an adjective.

The connectivity identification model, the generality identification model, and the sentence analysis model may be established considering the application field of a recognition model, the purpose of learning, the computer performance of a device, or the like. The connectivity identification model, the generality identification model, and the sentence analysis model may be models based on, for example, a neural network. The connectivity identification model, the generality identification model, and the sentence analysis model may include, for example, a neural network model or a deep learning model developed from the neural network model.

Figure 10:
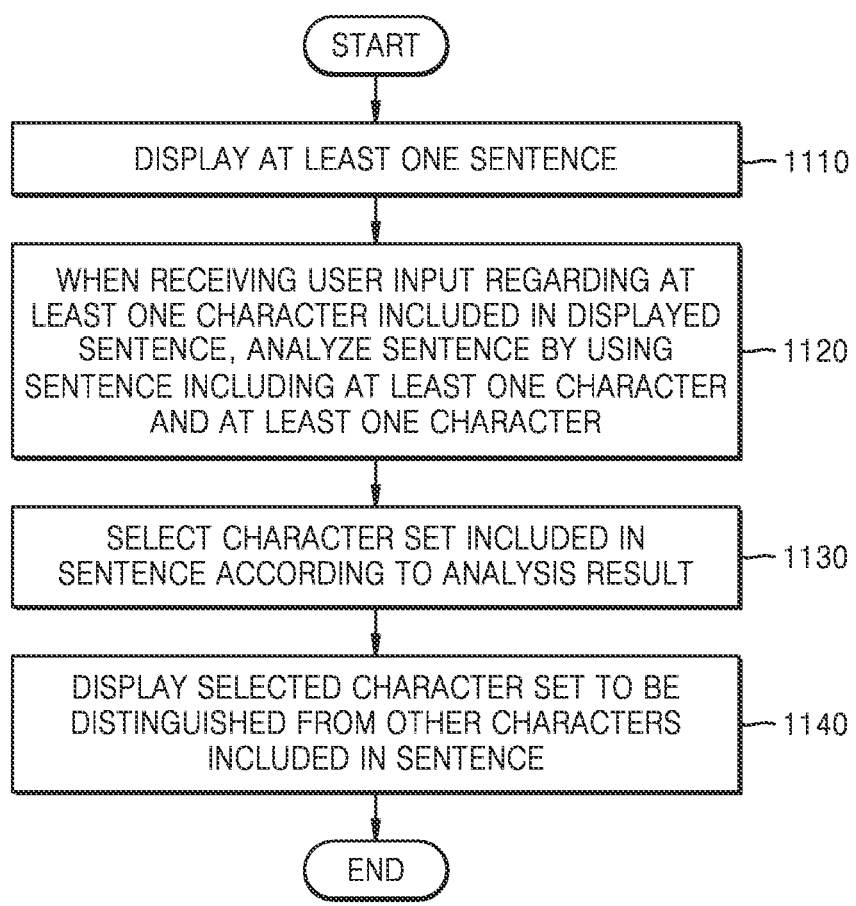
FIG. 10 is a flowchart of a state in which an electronic apparatus according to an embodiment identifies and displays a plurality of characters.

FIG. 10 is a flowchart of a state in which an electronic apparatus according to an embodiment identifies and displays a plurality of characters.

In operation 1110, the electronic apparatus 10 may display at least one sentence.

For example, the electronic apparatus 10 may display, on the display 220, a newspaper article displayed on a web browser.

In operation 1120, when receiving a user input to select at least one character included in a sentence, the electronic apparatus 10 may analyze the sentence by using the sentence including the at least one character and the at least one character.

For example, when the display 220 includes a touch screen display, the electronic apparatus 10 may receive a user input to select a character by touching an area of the touch screen display.

For example, the electronic apparatus 10, in response to the user selection, may obtain a character set including the selected character and at least one of the neighboring characters. The electronic apparatus 10 may obtain a plurality of character set candidates by repeatedly performing an operation of obtaining a character set.

The electronic apparatus 10 may obtain a plurality of candidate sentences respectively corresponding to a plurality of character set candidates, and may analyze the obtained candidate sentences.

For example, the electronic apparatus 10 may obtain the connectivity score of the character set candidates by analyzing the obtained candidate sentences. The connectivity score, which is a result of analyzing the candidate sentence, may be a score given to a character set. For example, the connectivity score may be a score that is calculated and given by the electronic apparatus 10 on the basis of how much connectivity a character set has in the relation with other characters in a sentence.

According to various embodiments, the electronic apparatus 10 may generate a new character set candidate by combining the obtained character set with another character in a process of obtaining one character set of a plurality of character set candidates.

In operation 1130, the electronic apparatus 10 may select the character set included in the sentence according to an analysis result. One character set selected by the electronic apparatus 10 is, for example, a result of analysis of a candidate sentence, which may be a character set having a high connectivity score.

In operation 1140, the electronic apparatus 10 may display the selected character set to be distinguished from the other characters included in the sentence.

For example, the electronic apparatus 10 may change and display the color of an area adjacent to the identified character set.

Figure 11:
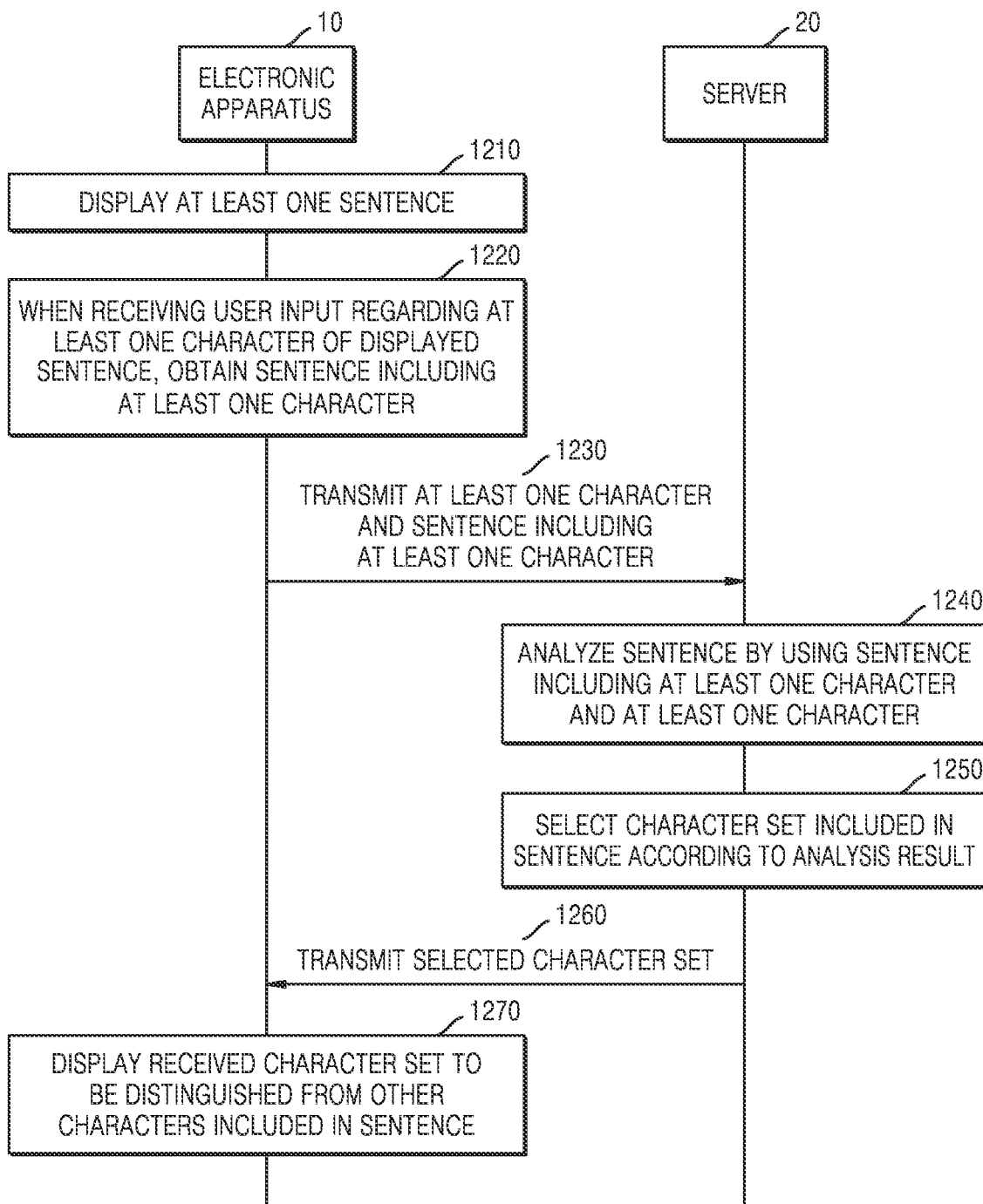
FIG. 11 is a flowchart of a state in which an electronic apparatus according to an embodiment in association with a server identifies and displays a plurality of characters.

FIG. 11 is a flowchart of a state in which an electronic apparatus according to an embodiment in association with a server identifies and displays a plurality of characters.

In operation 1210, the electronic apparatus 10 may display at least one sentence.

In operation 1220, when receiving a user input regarding at least one character of the displayed sentence, the electronic apparatus 10 may obtain the sentence including at least one character.

In operation 1230, the electronic apparatus 10 may transmit at least one character and the sentence including at least one character to the server 20.

In operation 1240, the server 20 may analyze the sentence by using the sentence including at least one character and the at least one character. In operation 1250, the server 20 may select the character set included in the sentence according to an analysis result. For example, the server 20 may obtain a plurality of character set candidates including the character selected corresponding to the user input, obtain a plurality of candidate sentences corresponding to the obtained character sets, and select one character set by analyzing the obtained candidate sentences.

In operation 1260, the server 20 may transmit a selected character set to the electronic apparatus 10.

In operation 1270, the electronic apparatus 10 may display the received character set to be distinguished from the other characters included in the sentence.

According to various embodiments, when the server 20 is connected to the electronic apparatus 10 and controls the display 220 of the electronic apparatus 10 to display a character, the server 20, in response to a user input of at least one character, may identify a sentence including the at least one character. In this case, the server 20 may control the display 220 of the electronic apparatus 10 to display a character set included in the sentence to be distinguished from other characters included in the sentence, according to an analysis result.

Figure 12:
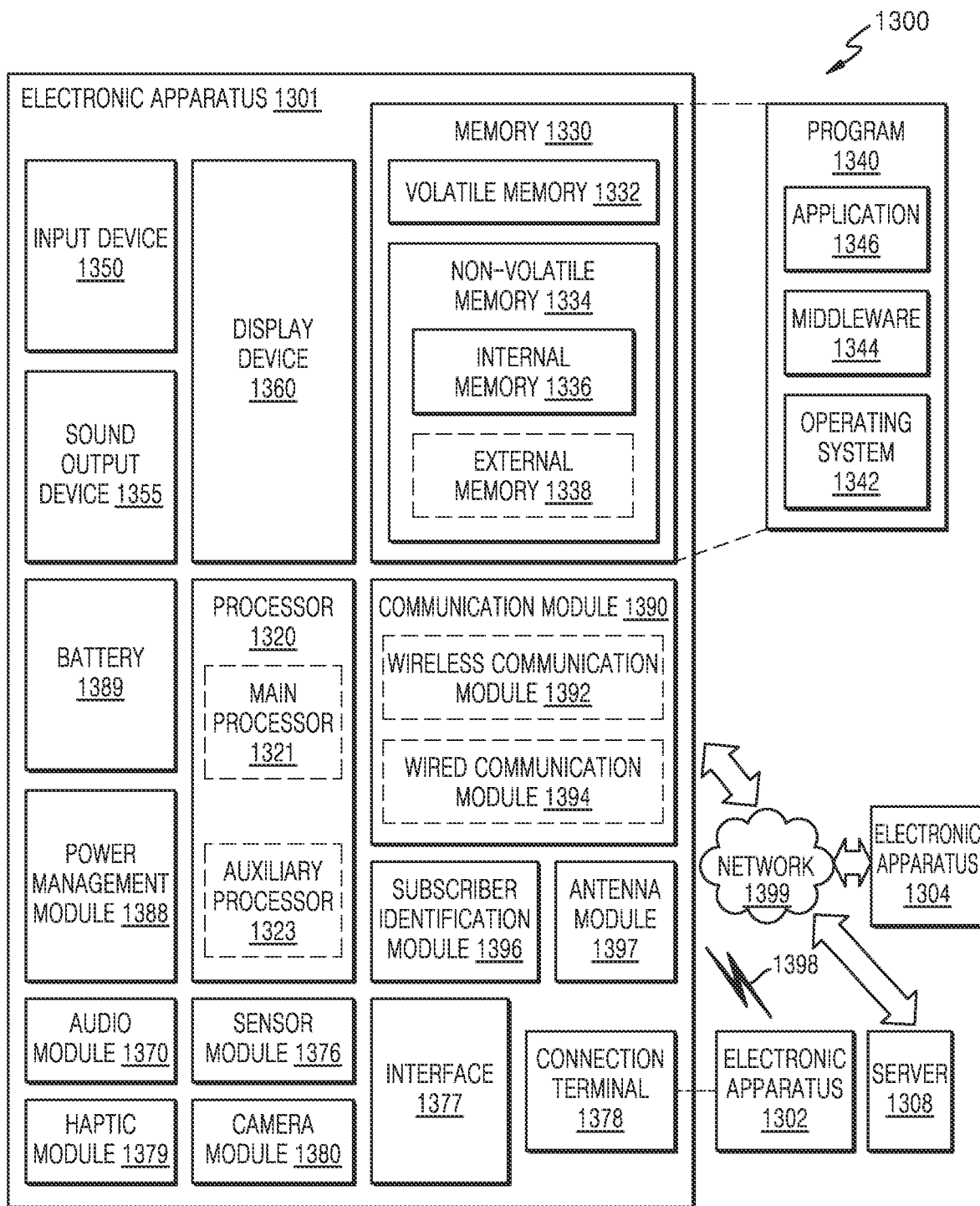
FIG. 12 is a block diagram of an electronic apparatus in a network environment, according to various embodiments.

FIG. 12 is a block diagram of an electronic apparatus 1301 in a network environment 1300, according to various embodiments. The electronic apparatus 1301 may include the electronic apparatus 10 of FIG. 1a. Referring to FIG. 12, in the network environment 1300, the electronic apparatus 1301 may communicate with an electronic apparatus 1302 via a first network 1398, for example, a short-range wireless communication network, or with an electronic apparatus 1304 or a server 1308 via a second network 1399, for example, a long-range wireless communication network. According to an embodiment, the electronic apparatus 1301 may communicate with the electronic apparatus 1304 via the server 1308. According to an embodiment, the electronic apparatus 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module 1396, or an antenna module 1397. In an embodiment, in the electronic apparatus 1301, at least one of the above constituent elements, for example, the display device 1360 or the camera module 1380, may be omitted, or one or more other constituent elements may be added. In an embodiment, some of the constituent elements may be implemented as one integrated circuit. For example, the sensor module 1376, for example, a fingerprint sensor, an iris sensor, or an illuminance sensor, may be implemented by being embedded in the display device 1360, for example, a display The processor 1320 may control at least one of other constituent elements, for example, hardware or software constituent element, of the electronic apparatus 1301 connected to the processor 1320 by executing, for example, software such as a program 1340, and perform various pieces of data processing or operations. According to an embodiment, as at least part of data processing or operation, the processor 1320 may load instructions or data received from other constituent elements, for example, the sensor module 1376 or the communication module 1390, on a volatile memory 1332, process the instructions or data stored in the volatile memory 1332, and store result data in a non-volatile memory 1334. According to an embodiment, the processor 1320 may include a main processor 1321, for example, a central processing device or an application processor, and an auxiliary processor 1323, for example, a graphics processing device, an image signal processor, a sensor hub processor, or a communication processor, which may be operated independently or altogether. Additionally or alternatively, the auxiliary processor 1323 may be configured to use less power than the main processor 1321, or to be specified to a designated function. The auxiliary processor 1323 may be implemented separately from or as a part of the main processor 1321.

The auxiliary processor 1323 may control at least some of functions or states related to at least one of constituent elements of the electronic apparatus 1301, for example, the display device 1360, the sensor module 1376, or the communication module 1390, for example, instead of the main processor 1321 when the main processor 1321 is in an inactive state, for example, a sleep state, or with the main processor 1321 when the main processor 1321 is in an active state, for example, an application execution state. According to an embodiment, the auxiliary processor 1323, for example, an image signal processor or a communication processor, may be implemented as a part of other functionally related constituent elements, for example, the camera module 1380 or the communication module 1390.

The memory 1330 may store various pieces of data used by at least one of constituent element of the electronic apparatus 1301, for example, the processor 1320 or the sensor module 1376. The data may include, for example, software such as the program 1340 and input data or output data regarding instructions related thereto. The memory 1330 may include the volatile memory 1332 or the non-volatile memory 1334.

The program 1340 may be stored as software in the memory 1330 and may include, for example, an operating system 1342, a middleware 1344, or an application 1346.

The input device 1350 may receive instructions or data used for the constituent element of the electronic apparatus 1301, for example, the processor 1320, from the outside of the electronic apparatus 1301, for example, from a user. The input device 1350 may include, for example, a microphone, a mouse, or a keyboard.

The sound output device 1355 may output a sound signal to the outside of the electronic apparatus 1301. The sound output device 1355 may include, for example, a speaker or a receiver. A speaker may be used for a general purpose such as multimedia reproduction or recording reproduction, and a receiver may be used for receiving an incoming call. According to an embodiment, the receiver may be implemented separated from or as a part of the speaker.

The display device 1360 may visually provide information to the outside of the electronic apparatus 1301, for example, to a user. The display device 1360 may include, for example, a display, a hologram device, or a projector, and a control circuit for control any of the devices. According to an embodiment, the display device 1360 may include a touch circuitry configured to sense a touch, or a sensor circuit, for example, a pressure sensor, configured to measure the strength of a force generated by the touch.

The audio module 1370 may convert sound to an electrical signal or reversely an electrical signal to sound. According to an embodiment, the audio module 1370 may obtain sound through the input device 1350 or output sound through the sound output device 1355 or an external electronic apparatus, for example, the electronic apparatus 1302 such as a speaker or a headphone, directly or wirelessly connected to the electronic apparatus 1301.

The sensor module 1376 may detect an operating state, for example, power or temperature, of the electronic apparatus 1301, or an external environment state, for example, a user state, and generate an electrical signal or a data value corresponding to a detected state. According to an embodiment, the sensor module 1376 may include, for example, a gesture sensor, a gyro sensor, a barometric pressure sensor, a magnetic sensor, an acceleration sensor, a grip sensor, a proximity sensor, a color sensor, an infrared (IR) sensor, a biological sensor, a temperature sensor, a humidity sensor, or an illuminance sensor.

The interface 1377 may support one or more designated protocols to be used for the electronic apparatus 1301 to directly or wirelessly connect to the external electronic apparatus, for example, the electronic apparatus 1302. According to an embodiment, the interface 1377 may include, for example, a high definition multimedia interface (HDMI), a universal serial bus (USB) interface, an SD card interface, or an audio interface.

A connection terminal 1378 may include a connector through which the electronic apparatus 1301 is physically connected to the external electronic apparatus, for example, the electronic apparatus 1302. According to an embodiment, the connection terminal 1378 may include, for example, an HDMI connector, a USB connector, an SD card connector, or an audio connector, for example, a headphone connector.

The haptic module 1379 may convert an electrical signal to a mechanical stimulus, for example, a vibration or a movement, which may be recognized by a user through a tactile sense or a sense of movement, or to an electrical stimulus. According to an embodiment, the haptic module 1379 may include, for example, a motor, a piezoelectric device, or an electrical stimulation device.

The camera module 1380 may photograph a still image and a video. According to an embodiment, the camera module 1380 may include one or more lenses, image sensors, image signal processors, or flashes.

The power management module 1388 may manage electric power supplied to the electronic apparatus 1301 According to an embodiment, the power management module 1388 may be implemented as, for example, at least a part of a power management integrated circuit (PMIC).

The battery 1389 may supply electric power to at least one of the constituent elements of the electronic apparatus 1301. According to an embodiment, the battery 1389 may include, for example, non-rechargeable primary cells, rechargeable secondary cells, or fuel cells.

The communication module 1390 may establish a direct communication channel, for example, a wired communication channel, or a wireless communication channel between the electronic apparatus 1301 and the external electronic apparatus, for example, the electronic apparatus 1302, the electronic apparatus 1304, or the server 1308, and support a communication through the established communication channel. The communication module 1390 may include one or more communication processors that are independently operated of the processor 1320, for example, an application processor, and support a direct communication, for example, a wired communication, or a wireless communication. According to an embodiment, the communication module 1390 may include a wireless communication module 1392, for example, a cellular communication module, a short-range wireless communication module, or a global navigation satellite system (GNSS) communication module, or a wired communication module 1394, for example, a LAN communication module, or a power line communication module. Any corresponding communication module of the communication modules may communicate with the external electronic apparatus through the first network 1398, for example, a short-range communication network such as Bluetooth, WiFi direct, or infrared data association (IrDA), or the second network 1399, for example, a long-range communication network such as a cellular network, the Internet, or a computer network such as LAN or WAN. These various types of communication modules may be implemented by being integrated into one constituent element, for example, a single chip, or as a plurality of separate constituent elements, for example, a plurality of chips. The wireless communication module 1392 may check and approve the electronic apparatus 1301 in a communication network such as the first network 1398 or the second network 1399 by using subscriber information, for example, the International Mobile Subscriber Identity (IMSI), stored in the subscriber identification module 1396.

The antenna module 1397 may transmit a signal or power to the outside, for example, the external electronic apparatus, or receive the same from the outside. According to an embodiment, the antenna module 1397 may include one or more antennas, and, among them, at least one antenna suitable for a communication method used for the communication network such as the first network 1398 or the second network 1399 may be selected by, for example, the communication module 1390. The signal or power may be transmitted or received between the communication module 1390 and the external electronic apparatus through the selected at least one antenna.

At least some of the constituent elements may be mutually connected to each other through a communication method between peripheral devices, for example, a bus, a general-purpose input and output (GPIO), a serial peripheral interface (SPI), or a mobile industry processor interface (MIPI), and exchange signals, for example, instructions or data therebetween.

According to an embodiment, the instructions or data may be transmitted or receive between the electronic apparatus 1301 and the electronic apparatus 1304 at the outside via the server 1308 connected to the second network 1399. The electronic apparatuses 1302 and 1304 each may be apparatuses that are the same as or different from the electronic apparatus 1301. The server 1308 may include a communication module (not shown), a processor (not shown), and a memory (not shown). However, the disclosure is not limited thereto, and the server 1308 may further include constituent elements or omit some constituent elements. The server 1308 may include the server 20 of FIG. 11. According to an embodiment, all or some of the operations performed in the electronic apparatus 1301 may be performed in one or more external apparatuses of the external electronic apparatuses such as the electronic apparatuses 1302 and 1304 or the server 1308. For example, when the electronic apparatus 1301 is supposed to perform a function or a service automatically or in response to a request from a user or another apparatus, the electronic apparatus 1301 may request one or more external electronic apparatuses to perform at least part of the function or the service, rather than performing the function or the service, or in addition thereto. The one or more external electronic apparatuses having received the request may perform at least part of the requested function or service, or an additional function or service related to the request, and transmit a result of the performance to the electronic apparatus 1301. The electronic apparatus 1301 may process the result, as it is or additionally, and provide the result as at least part of a response to the request.

Alternatively, the electronic apparatus 1301 may transmit at least one character specified by a user selection and a sentence including the at least one character to the server 1308, and receive a result of selecting the character set included in the sentence by analyzing the sentence using the at least one character and the sentence including the at least one character received by the server 1308. To this end, for example, cloud computing, distributed computing, or client-server computing technologies may be used.

Various embodiments of the disclosure may be implemented as software, for example, the program 1340, including one or more instructions, stored in a storage medium, for example, an internal memory 1336 or an external memory 1338, which is readable by a machine, for example, the electronic apparatus 1301. For example, a processor, for example, the processor 1320, of an apparatus, for example, the electronic apparatus 1301, may retrieve and execute at least one of the one or more instructions stored in the storage medium. This enables the apparatus to be operated to perform at least one function according to the retrieved at least one instruction. The one or more instructions may include codes generated by a compiler or codes that can be executed by an interpreter. An apparatus-readable storage medium may be provided in the form of a non-transitory storage medium. Being 'non-transitory' may mean that a storage medium is a tangible device, and does not include a signal, for example, an electromagnetic wave, and the term does not distinguish between a case where data is stored semi-permanently in a storage medium and a case that is temporarily stored.

According to an embodiment, the methods according to various embodiments disclosed in the disclosure may be provided by being included in computer program products. A computer program product is a product traded between a seller and a buyer. The computer program product may be distributed in the form of an apparatus-readable storage medium, for example, a compact disc read only memory (CD-ROM), or distributed directly or online, for example, download or upload, through an application store, for example, PlayStore™ or between two user devices, for example, smartphones. For online distribution, at least part of a computer program product may be at least temporarily stored in, or temporarily generated from, an apparatus-readable storage medium such as a manufacturer's server, an application store's server, or a relay server's memory.

According to various embodiments, each of the above-described constituent elements, for example, a module or a program, may include a single or a plurality of objects. According to various embodiments, of the above-described constituent elements, one or more constituent elements or operations may be omitted, or one or more other constituent elements or operations may be added. Alternatively or additionally, a plurality of constituent elements, for example, modules or programs, may be integrated as one constituent element. In this case, the integrated constituent element may perform one or more functions of each of the constituent elements identically or similarly to the one or more function performed before the integration by the constituent element of the constituent elements. According to various embodiments, operations performed by modules, programs, or other constituent elements may be performed sequentially, parallelly, repeatedly, or heuristically, one or more of the operations may be performed in another other or omitted, or one or more other operations may be added.

The invention claimed is:

1. An electronic apparatus comprising:
   a display;
   a processor; and
   a memory,
   wherein the memory stores instructions to enable the processor to:
      control the display to display at least one sentence,
      receive a user input regarding at least one character of the at least one sentence that is displayed,
      analyze, in response to the user input, the at least one sentence,
      obtain a plurality of character set candidates consisting of the at least one character and at least one of neighboring characters in the at least one sentence,
      select a character set from among the plurality of character set candidates included in the at least one sentence according to an analysis result, and
      display the selected character set to be distinguished from other characters included in the at least one sentence.

2. The electronic apparatus of claim 1, wherein the character set comprises at least one character corresponding to the user input.

3. The electronic apparatus of claim 2, wherein the character set comprises a plurality of characters.

4. The electronic apparatus of claim 3, wherein the character set comprises a plurality of characters located adjacent to each other.

5. The electronic apparatus of claim 1, wherein the instructions enable the processor to identify a search category based on a content of other character sets included in the at least one sentence when a search is performed by using an identified character set.

6. The electronic apparatus of claim 1, wherein the instructions enable the processor to analyze the at least one sentence on the basis of, when the plurality of character set candidates are substituted by other character sets, a connectivity score is obtained according to a correlation between substituted character set and other characters or other words included in the plurality of candidate sentences.

7. The electronic apparatus of claim 1, wherein the instructions enable the processor to analyze the at least one sentence on the basis of obtaining a generality score according to frequency of use and importance of a character or a word included in each of the plurality of character set candidates.

8. The electronic apparatus of claim 1, wherein the instructions enable the processor to analyze the at least one sentence according to classification of sentence constituent elements of the at least one sentence including the at least one character selected corresponding to the user input, in terms of grammatical characteristics of the sentence constituent elements.

9. The electronic apparatus of claim 1, wherein the instructions enable the processor to use a search history previously stored in the memory when analyzing the at least one sentence.

10. The electronic apparatus of claim 1, further comprising:
a communication module,
wherein the instructions enable the processor to control the communication module to:
transmit to a server the at least one sentence including the at least one character and the at least one character, and
receive a result of selecting, by the server, a character set included in the at least one sentence by analyzing the at least one sentence by using the at least one sentence including the at least one character and the at least one character.

11. A server comprising:
a communication module;
a processor; and
a memory,
wherein the memory stores instructions to enable the processor to:
control the communication module to receive, from an external device, a sentence including at least one character and the at least one character,
analyze the sentence,
obtain a plurality of character set candidates consisting of the at least one character and at least one of neighboring characters in the sentence,
select a character set from among the plurality of character set candidates included in the sentence according to an analysis result, and
control the communication module to transmit the selected character set to the external device.

12. A method performed by an electronic apparatus, the method comprising:
displaying at least one sentence;
receiving a user input regarding at least one character of the at least one sentence that is displayed;
analyzing the at least one sentence;
obtaining a plurality of character set candidates consisting of the at least one character and at least one of neighboring characters in the at least one sentence;
selecting a character set from among the plurality of character set candidates included in the at least one sentence according to an analysis result; and
displaying the selected character set to be distinguished from other characters included in the at least one sentence.

13. A non-transitory computer-readable recording medium having stored therein instructions to be executed on a computer to:
display at least one sentence;
receive a user input regarding at least one character of the at least one sentence that is displayed;
analyze the at least one sentence;
obtain a plurality of character set candidates consisting of the at least one character and at least one of neighboring characters in the at least one sentence;
select a character set from among the plurality of character set candidates included in the at least one sentence according to an analysis result; and
display the selected character set to be distinguished from other characters included in the at least one sentence.

* * * * *